(12) United States Patent
Kim et al.

(10) Patent No.: US 11,210,678 B2
(45) Date of Patent: Dec. 28, 2021

(54) COMPONENT FOR PROVISIONING SECURITY DATA AND PRODUCT INCLUDING THE SAME

(71) Applicant: SAMSUNG ELECTRONICS CO., LTD., Suwon-si (KR)

(72) Inventors: Jeong-tae Kim, Hwaseong-si (KR); Bo-gyeong Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 489 days.

(21) Appl. No.: 15/794,190

(22) Filed: Oct. 26, 2017

(65) Prior Publication Data
US 2018/0144347 A1 May 24, 2018

(30) Foreign Application Priority Data

Nov. 18, 2016 (KR) .................. 10-2016-0154455
Apr. 18, 2017 (KR) .................. 10-2017-0049805

(51) Int. Cl.
*G06Q 30/00* (2012.01)
*H04L 9/08* (2006.01)
*H04L 9/32* (2006.01)

(52) U.S. Cl.
CPC ....... *G06Q 30/0185* (2013.01); *H04L 9/0866* (2013.01); *H04L 9/0869* (2013.01); *H04L 9/0894* (2013.01); *H04L 9/3234* (2013.01); *G06Q 2220/10* (2013.01)

(58) Field of Classification Search
CPC ............ G06Q 30/0185; G06Q 2220/10; H04L 9/3234; H04L 9/0869; H04L 9/0894; H04L 9/0866

USPC .......................................................... 705/50
See application file for complete search history.

(56) References Cited

U.S. PATENT DOCUMENTS

| | | | | |
|---|---|---|---|---|
| 5,787,169 A | * | 7/1998 | Eldridge ................. | G06F 21/40 380/286 |
| 2005/0089161 A1 | * | 4/2005 | Yokota .................... | G06F 7/724 380/30 |
| 2008/0178006 A1 | * | 7/2008 | Mullor .................... | G06F 21/33 713/184 |
| 2009/0110191 A1 | * | 4/2009 | Sanvido ................. | H04L 9/0822 380/44 |
| 2010/0042848 A1 | * | 2/2010 | Rosener ................. | G06F 21/32 713/184 |
| 2013/0111598 A1 | * | 5/2013 | Marcovecchio .... | H04W 12/082 726/26 |
| 2014/0082359 A1 | * | 3/2014 | Nakhjiri ................ | H04L 63/061 713/168 |
| 2015/0242614 A1 | | 8/2015 | Scagnol et al. | |

(Continued)

*Primary Examiner* — Zeshan Qayyum
(74) *Attorney, Agent, or Firm* — Sughrue Mion, PLLC

(57) ABSTRACT

A security component according to an example embodiment includes: a user authentication processor configured to authenticate the input data by determining whether the input data is provided by an authorized user of the security component based on component user data of the input data; a master key generator configured to generate a master key based on the component user data of the input data in response to the user authentication processor authenticating the input data; a decryption processor configured to generate security data by decrypting encrypted data of the input data based on the master key; and a security storage configured to store the security data.

20 Claims, 9 Drawing Sheets

(56) References Cited

U.S. PATENT DOCUMENTS

| | | |
|---|---|---|
| 2015/0348182 A1 | 12/2015 | Cismas et al. |
| 2016/0006712 A1 | 1/2016 | Sade et al. |
| 2016/0218875 A1 | 7/2016 | Le Saint et al. |
| 2016/0277374 A1* | 9/2016 | Reid ............... H04L 63/061 |
| 2018/0018290 A1* | 1/2018 | Zuckerman ......... G06F 9/467 |

\* cited by examiner

COMPONENT FOR PROVISIONING SECURITY DATA AND PRODUCT INCLUDING THE SAME

CROSS-REFERENCE TO RELATED APPLICATIONS

This application claims priority from Korean Patent Application Nos. 10-2016-0154455, filed on Nov. 18, 2016 and 10-2017-0049805, filed on Apr. 18, 2017 in the Korean Intellectual Property Office, the disclosures of which are incorporated herein by reference in their entireties.

BACKGROUND

Methods and apparatuses consistent with example embodiments relate to provisioning security data, and more particularly, to components for provisioning security data and products including the same.

Security data, which is to be protected from external inappropriate access, may be included in products in various ways. For example, a product manufacturer may receive components including security data from a component supplier, or may provision security data into components, or a product including the components, at a production stage of the product. While the former method may securely incorporate security data into the product, security data may be exposed to the component supplier, and it is not easy to change the security data due to the change of usage environment of the components. In addition, while the latter method is easy to change security data, it is difficult to protect security data from inappropriate access from outside the product due to an interface for provisioning the security data.

SUMMARY

Aspects of one or more example embodiments provide a component included in a product to safely provision security data protected from external inappropriate access to the product and a method of provisioning the security data.

According to an aspect of an example embodiment, there is provided a security component configured to be included in a product and process an input data for authenticating the product, the security component including: a user authentication processor configured to authenticate the input data by determining whether the input data is provided by an authorized user of the security component based on component user data of the input data; a master key generator configured to generate a master key based on the component user data of the input data in response to the user authentication processor authenticating the input data; a decryption processor configured to generate security data by decrypting encrypted data of the input data based on the master key; and a security storage configured to store the security data.

According to an aspect of another example embodiment, there is provided a product configured to respond to an external product authentication request based on security data stored in the product, the product including: a communication interface configured to receive input data comprising encrypted data and component user data; and a security component configured to authenticate the input data based on the component user data, generate the security data by decrypting the encrypted data of the input data based on the component user data in response to authenticating the input data, and store the security data.

According to an aspect of yet another example embodiment, there is provided a method of authenticating a product using a security component, the method including: authorizing an input data by determining whether the input data is provided by an authorized user based on component user data of the input data; generating a master key, in response to the input data being authorized, based on the component user data of the input data; generating a security data by decrypting encrypted data of the input data based on the master key; and storing the security data.

BRIEF DESCRIPTION OF THE DRAWINGS

Example embodiments will be more clearly understood from the following detailed description taken in conjunction with the accompanying drawings in which.

DETAILED DESCRIPTION

Figure 1:
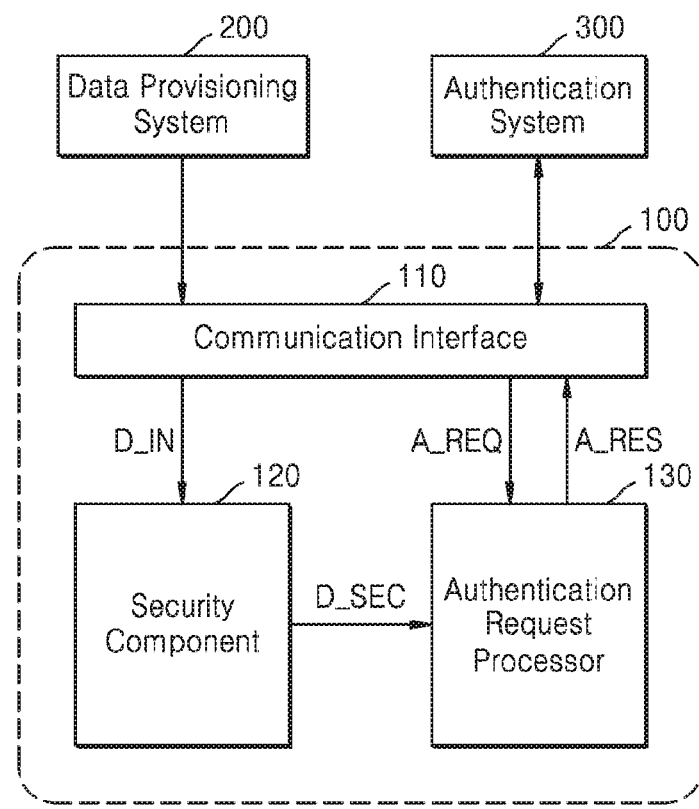
FIG. 1 is a block diagram of a product including security data and external systems, according to an example embodiment.

FIG. 1 is a block diagram of a product 100 including security data and external systems according to an example embodiment. As illustrated in FIG. 1, the product 100 may communicate with a data provisioning system 200 and an authentication system 300 and may include a communication interface 110, a security component 120 and an authentication request processor 130. As components included in the product 100, each of the communication interface 110, the security component 120, and the authentication request processor 130 may include a logic block designed through logic synthesis or a software block executed by a processor.

The product 100 may respond to an external request, for example, an authentication request A_REQ, based on security data. For example, the product 100 may be an independent computing device such as a personal computer (PC), a network server, a tablet PC, an e-reader, a personal digital assistant (PDA), a portable multimedia player (PMP), a mobile phone, a smart phone, a wearable device, etc., or any object that provides a specific function, such as an automobile, a mechanical device, a manufacturing facility, a door, an illumination, or the like.

The product 100 may communicate with other devices, such as the data provisioning system 200, the authentication system 300, or other products similar to the product 100, via the communication interface 110 included in the product 100. For example, the product 100 may be connected to a mobile telecommunication system such as a Long Term Evolution (LTE) system, a Code Division Multiple Access (CDMA) system, or a Global System for Mobile Communications system, may be connected to a communication network such as a wide area network (WAN), a local area network (LAN), or a wireless local area network (WLAN), or may be connected to Internet of Things (IoT), via the communication interface 110. The communication interface 110 may support one or more communication methods, and for example, the data provisioning system 200 and the authentication system 300 in FIG. 1 may communicate with the product 100 through an identical communication method or different communication methods.

The security data may include personal data about a user of the product 100, or may include one among an identifier (ID) of the product 100, supplier data of the product 100, a certificate, a private key, and a pre-shared key (PSK) as data for authentication of the product 100. The data for authentication of the product 100 included in the security data may be used for operations requiring authentication of the product 100, such as a remote operation of the product 100, software upgrade, etc. as a non-limiting example. For example, when the product 100 accesses the IoT through the communication interface 110, the reliability of data obtained from the product 100 and transmitted to the outside via the communication interface 110 or the reliability of data received from the outside via the communication interface 110 may be based on the authentication of the product 100. To prevent the security data from being exposed, deleted or altered due to unauthorized access attempts, the security data needs to be safely protected from inappropriate access outside the product 100.

The security data may be included in the security component 120 of the product 100. For example, the security component 120 may include a component capable of storing data, such as a semiconductor memory device, and security data may be stored in the component of the security component 120.

When the security data is provisioned to the security component 120 at a production stage of the security component 120, utilization of the security component 120 by a user of the security component 120 may be reduced and production efficiency of the security component 120 by a supplier of the security component 120 may be reduced. For example, when the product 100 is implemented in various usage environments, such as when the product 100 is connected to the IoT through the communication interface 110, the utilization of the security component 120 by the user of the security component 120 (or a supplier or producer of the product 100) may be reduced due to the difficulty of modifying security data included in the security component 120. In addition, the production efficiency of the security component 120 by a supplier (or producer) of the security component 120 may be reduced due to a process for provisioning the security data and preparation of the preliminarily provisioned security component 120. As described below, example embodiments allow for the security data to be provisioned safely to the security component 120 later (i.e., after production of the security component 120). The user of the security component 120 may refer to the supplier and/or producer of the product 100 supplying the product 100 including the security component 120, or a developer and/or user who uses (e.g., customizes) the product 100 including the security component 120. Furthermore, the supplier of the security component 120 may refer to the producer of the security component 120 that supplies the security component 120.

Referring to FIG. 1, the data provisioning system 200 may provide input data D_IN to the security component 120 via the communication interface 110. The data provisioning system 200 may be operated by the user of the security component 120, for example, the supplier or producer of the product 100, for provisioning the security data. For example, the data provisioning system 200 may provide the input data D_IN at the production stage of the product 100 and may provide the input data D_IN after the product 100 is shipped. As described below with reference to FIG. 2, the input data D_IN may include component user data and encrypted data, and the security data may be encrypted as a part of the encrypted data.

The security component 120 may receive the input data D_IN and provide security data D_SEC to the authentication request processor 130. The security component 120 may authenticate the input data D_IN by determining whether the input data D_IN is provided by an authorized user of the security component 120, and may store the security data D_SEC from the authenticated input data D_IN and provide the security data D_SEC to the authentication request processor 130. The security component 120 will be described below in detail with reference to FIGS. 3 and 5.

The authentication system 300 may provide the authentication request A_REQ to the authentication request processor 130 via the communication interface 110, and the authentication request processor 130 may provide an authentication response A_RES to the authentication system 300 through the communication interface 110. The authentication system 300 may be operated by the user of the security component 120, for example, the supplier or producer of the product 100, to authenticate the product 100. For example, the authentication system 300 may provide the authentication request A_REQ to the product 100 to remotely control the product 100 or upgrade software included in the product 100, and may authenticate the product 100 based on the authentication response A_RES provided from the product 100. Although not shown, other products similar to the product 100 may also provide the authentication request A_REQ to the product 100 for communication with the product 100.

The authentication request processor 130 may provide the authentication response A_RES to the authentication system 300 via the communication interface 110 based on the security data D_SEC provided to the security component 120. For example, the authentication request processor 130 may provide the authentication system 300 with the ID of the product 100 as the authentication response A_RES based on the security data D_SEC.

Figure 2:
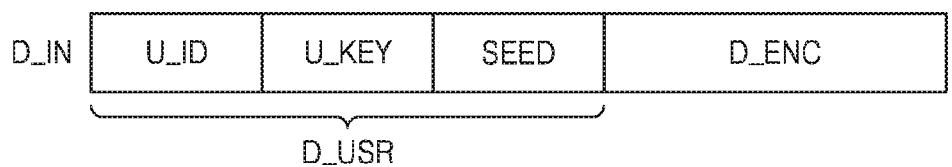
FIG. 2 is a view of input data according to an example embodiment.

FIG. 2 is a view of the input data D_IN of FIG. 1 according to an example embodiment. As described above with reference to FIG. 1, the input data D_IN may be provided to the product 100 from the data provisioning system 200, and the security component 120 included in the product 100 may receive the input data D_IN. Hereinafter, the input data D_IN will be described with reference to FIGS. 1 and 2.

Referring to FIG. 2, the input data D_IN may include component user data D_USR and encrypted data D_ENC.

The component user data D_USR may include data about the user of the security component 120 (e.g., the supplier or producer of the product 100). For example, as illustrated in FIG. 2, the component user data D_USR may include a user identifier U_ID, a user key U_KEY, a seed (or seed data) SEED. As described below with reference to FIG. 8, the component user data D_USR may be data provided to the user of the security component 120 from the supplier of the security component 120. That is, the supplier of the security component 120 may issue the user identifier U_ID, the user key U_KEY, and the seed SEED to the user of the security component 120 before and after supplying the security component 120, and the user of the security component 120 may provide the security component 120 with the user identifier U_ID, the user key U_KEY and the seed SEED as a part of the input data D_IN. As described below with reference to FIG. 3 and the like, the component user data D_USR may be used by the security component 120 to authenticate the input data D_IN and to decrypt the encrypted data D_ENC.

The encrypted data D_ENC may include data generated by encrypting the security data in advance by the user of the security component 120. In order to protect the security data when the input data D_IN is exposed by inappropriate access in the process of providing the input data D_IN from the data provisioning system 200 to the product 100, the security data may be encrypted and included in the input data D_IN. An encryption method of the security data used by the user of the security component 120 may be shared in advance with the supplier of the security component 120 and may be encrypted using an encryption key (e.g., a master key M_KEY of FIG. 8) provided by the supplier of the security component 120. Accordingly, the user of the security component 120 may secure security of a master key issued to the user, so that the security data included in the input data D_IN as a part of the encrypted data D_ENC may be protected from inappropriate external access even if the input data D_IN is exposed.

Figure 3:
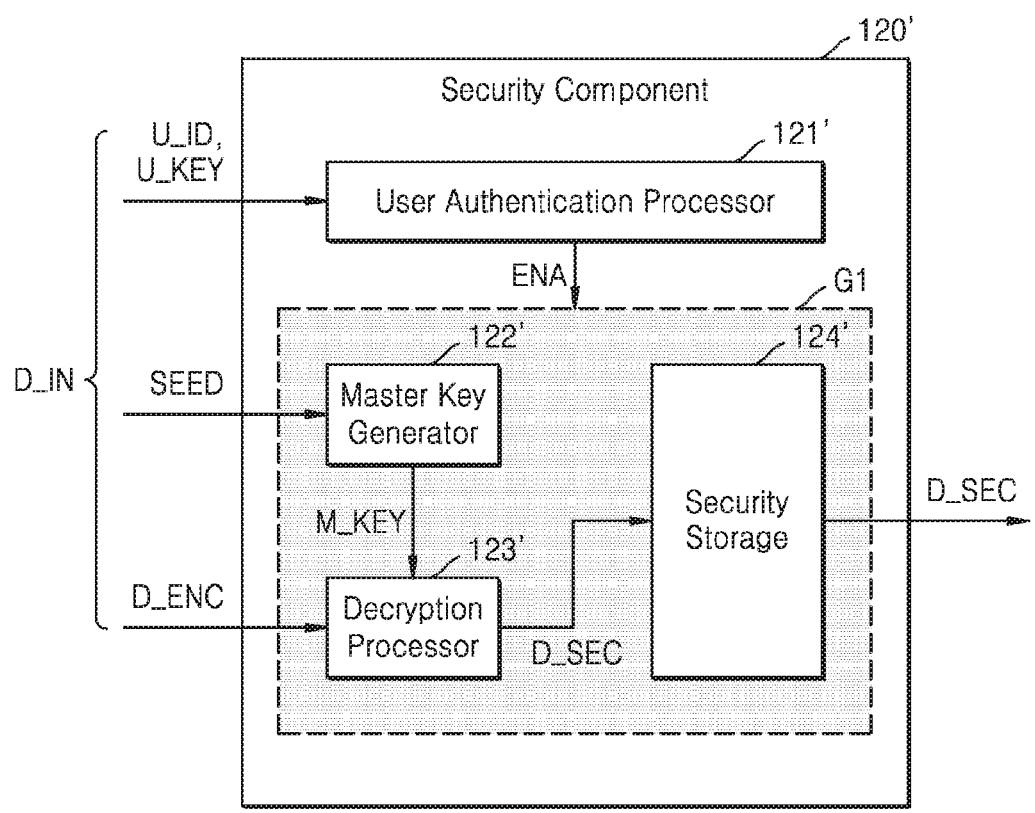
FIG. 3 is a block diagram of a security component according to an example embodiment.

FIG. 3 is a block diagram of a security component 120' according to an example embodiment. As described above with reference to FIG. 1, a security component may receive input data D_IN provided from the data provisioning system 200 and provide the security data D_SEC to the authentication request processor 130. As illustrated in FIG. 3, the security component 120' may include a user authentication processor 121', a master key generator 122', a decryption processor 123', and a security storage 124'. Each of the user authentication processor 121', the master key generator 122', the decryption processor 123', and the security storage 124' may include a logic block designed through logic synthesis or the like, or may include a software block executed by a processor. Hereinafter, FIG. 3 will be described with reference to FIG. 1.

The user authentication processor 121' may authenticate the input data D_IN by determining whether the input data D_IN is provided by an authorized user of the security component 120' using the user identifier U_ID and the user key U_KEY included in the input data D_IN. As described above with reference to FIG. 2, the user identifier U_ID and the user key U_KEY may be provided in advance to the authorized user of the security component 120' by a supplier of the security component 120'. The user identifier U_ID and the user key U_KEY provided to the authorized user of the security component 120' may satisfy a predetermined relationship. Accordingly, the user authentication processor 121' may determine whether the input data D_IN is provided by the authorized user of the security component 120' by detecting whether a relationship between the identifier U_ID and the user key U_KEY satisfies the predetermined relationship. If it is determined that the input data D_IN is provided by the authorized user of the security component 120', that is, if the input data D_IN is successfully authenticated, the user authentication processor 121' may provide an activated enable signal ENA, but otherwise may provide a deactivated enable signal ENA. An operation of the user authentication processor 121' will be described below in detail with reference to FIG. 4.

The master key generator 122' may generate a master key M_KEY using the seed SEED included in the input data D_IN. As described above with reference to FIG. 2, the seed SEED and a master key used to encrypt the security data may be provided in advance to the authorized user of the security component 120' by the supplier of the security component 120'. The seed SEED and the master key provided to the authorized user of the security component 120' may satisfy a predetermined relationship, and accordingly the master key M_KEY generated by the master key generator 122' may be equal to the master key used to encrypt the security data if the seed SEED is for the authorized user of the security component 120'. Accordingly, the master key M_KEY may not be exposed to the outside in a process of transmitting the input data D_IN to the product 100, and as a result, the security data encrypted by the master key M_KEY may be protected.

The decryption processor 123' may decrypt the encrypted data D_ENC included in the input data D_IN using the master key M_KEY provided from the master key generator 122'. Because the input data D_IN provided by the authorized user of the security component 120' includes the encrypted data D_ENC generated by encrypting the security data in a manner shared with the supplier of the security component 120' using the master key provided from the supplier of the security component 120', the security data D_SEC generated by the decryption processor 123' by decrypting the encrypted data D_ENC may include the security data if the master key M_KEY provided by the master key generator 122' is legitimate.

The security storage 124' may store the security data D_SEC provided from the decryption processor 123' and provide the stored security data D_SEC to the authentication request processor 130 of FIG. 1. According to an example embodiment, the security storage 124' is nonvolatile memory that does not lose stored data even if power supplied to the security component 120' is blocked, and may include, but is not limited to, electrically erasable programmable read-only memory (EEPROM), flash memory, phase change random access memory (PRAM), resistive RAM (RRAM), nano-floating gate memory (NFGM), polymer RAM (PoRAM), magnetic RAM (MRAM), or ferroelectric RAM (FRAM). In some example embodiments, the security storage 124' may include One-Time Programmable (OTP) memory that stores at least some of the security data D_SEC, and the at least some of the security data D_SEC may be stored in the OTP memory so that deletion and/or modification may be prevented. In some example embodiments, the security storage 124' may include rewritable memory that stores at least some of the security data D_SEC, and the at least some of the security data D_SEC may be deleted and/or modified by being stored in the writable memory.

As illustrated in FIG. 3, the master key generator 122', the decryption processor 123', and the security storage 124' may be included in a first group G1. The first group G1 may receive the enable signal ENA from the user authentication processor 121' and at least one of the master key generator 122', the decryption processor 123', and the security storage 124' may perform operations in response to the activated enable signal ENA, and not perform the operations in response to the deactivated enable signal ENA. For example, the master key generator 122' and the decryption processor 123' may be disabled in response to the deactivated enable signal ENA, and the security storage 124' may perform only an output operation of the security data D_SEC in response to the deactivated enable signal ENA.

In an example embodiment, the security component 120' may be set such that the security data D_SEC is unchanged after storing the security data D_SEC generated from the authenticated input data D_IN. That is, at least one of the user authentication processor 121', the master key generator 122', the decryption processor 123', and the security storage 124' may perform only an operation for the first authenticated input data D_IN. For example, the security component 120' may include a memory device that stores data indicating whether the operation for the first authenticated input data D_IN has been completed. At least one of the user authentication processor 121', the master key generator 122', the decryption processor 123', and the security storage 124' may ignore the input data D_IN provided to the security component 120' according to the data stored in the memory device, and the already stored security data D_SEC may be protected. In some example embodiments, the memory device that stores the data indicating whether the operation for the first authenticated input data D_IN has been completed may include an OTP device that irreversibly stores data such as an anti-fuse, and the OTP device may be programmed when the operation for the first authenticated input data D_IN is completed. In some example embodiments, the memory device that stores the data indicating whether the operation for the first authenticated input data D_IN has been completed may include a rewritable memory device, and when the operation for the first authenticated input data D_IN is completed, data indicating the completion may be written to the rewritable memory device.

Figure 4:
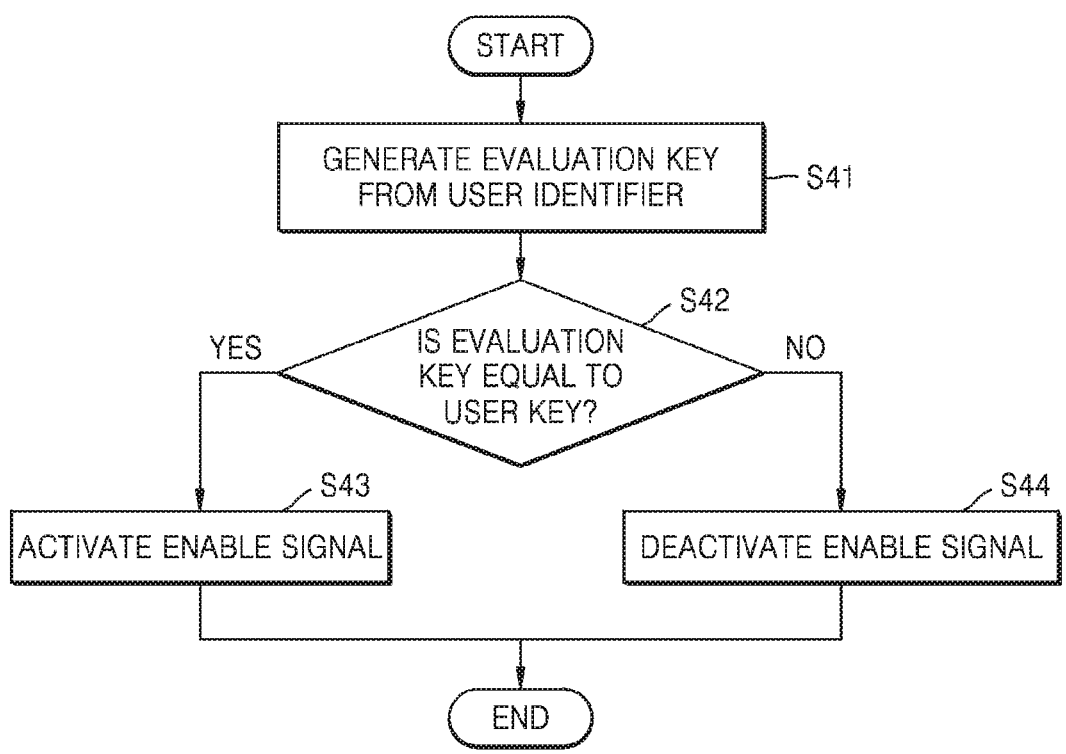
FIG. 4 is a flowchart illustrating operation of a user authentication processor according to an example embodiment.

FIG. 4 is a flowchart of an exemplary operation of the user authentication processor 121' of FIG. 3, according to an example embodiment. As described above with reference to FIG. 3, the user authentication processor 121' may authenticate the input data D_IN by determining whether the input data D_IN is provided by the authorized user of the security component 120' using the user identifier U_ID and the user key U_KEY included in the input data D_IN. Hereinafter, FIG. 4 will be described with reference to FIG. 3.

Referring to FIG. 4, an operation of generating an evaluation key from the user identifier U_ID in operation S41 may be performed. For example, the user authentication processor 121' may generate the evaluation key from the user identifier U_ID based on a predetermined method, such as a mathematical operation, a logical operation, a lookup table, and the like. The user authentication processor 121' may be designed by the supplier of the security component 120' so that the evaluation key generated from the user identifier U_ID issued to the authorized user of the security component 120' is equal to the user key U_KEY issued simultaneously with the user identifier U_ID.

In operation S42, an operation of determining whether the evaluation key is equal to the user key U_KEY may be performed. If the evaluation key is equal to the user key U_KEY, that is, if the user identifier U_ID and the user key U_KEY included in the input data D_IN belong to the authorized user of the security component 120', in operation S43, an operation of activating the enable signal ENA may be performed. Meanwhile, if the evaluation key is not equal to the user key U_KEY, that is, if the user identifier U_ID and the user key U_KEY included in the input data D_IN do not belong to the authorized user of the security component 120', in operation S44, an operation of deactivating the enable signal ENA may be performed.

Figure 5:
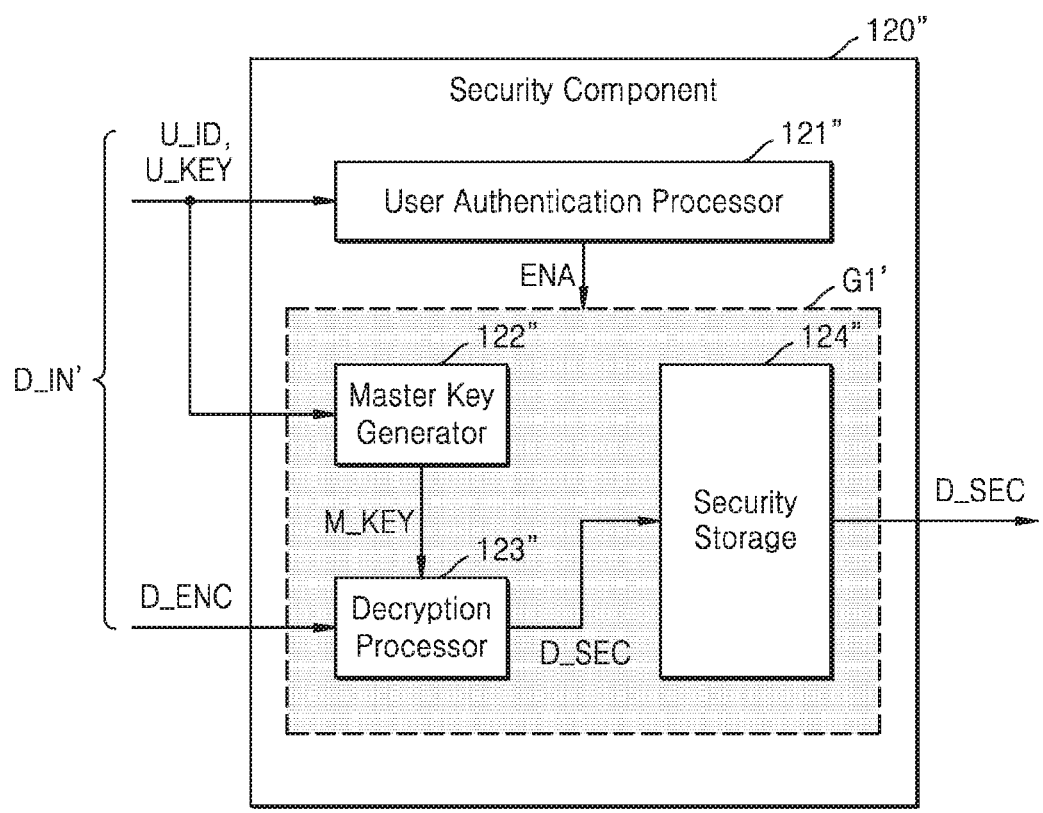
FIG. 5 is a block diagram of a security component according to an example embodiment.

FIG. 5 is a block diagram of a security component 120'' according to an example embodiment. As described above with reference to FIG. 1, a security component may receive input data D_IN provided from the data provisioning system 200 and provide the security data D_SEC to the authentication request processor 130. As illustrated in FIG. 5, the security component 120'' may include a user authentication processor 121'', a master key generator 122'', a decryption processor 123'', and a security storage 124''. The seed SEED may be excluded from the input data D_IN'' received by the security component 120'', as compared to the security component 120' of FIG. 3. Hereinafter, in the description of the security component 120'' of FIG. 5, redundant description of the security component 120' of FIG. 3 will be omitted.

According to an example embodiment, the master key M_KEY in the security component 120'' may be generated from the user identifier U_ID and/or the user key U_KEY. That is, a supplier of the security component 120'' may issue a master key having a certain relationship with the user identifier U_ID and/or user key U_KEY to an authorized user of the security component 120'' instead of issuing separate seed data. The user of the security component 120'' may prepare the encrypted data D_ENC by encrypting the security data using the master key provided by the supplier of the security component 120'', and may provide input data D_IN' including the user identifier U_ID to the security component 120'' as the encrypted data D_ENC and the component user data D_USR.

As illustrated in FIG. 5, the master key generator 122'' may receive the user identifier U_ID and/or the user key U_KEY from the input data D_IN'' when authenticated by the user authentication processor 121'', and may generate the master key M_KEY according to a predetermined method from the user identifier U_ID and/or the user key U_KEY.

Figure 6:
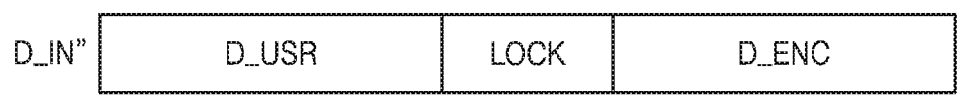
FIG. 6 is a view of input data according to an example embodiment.
Figure 7:
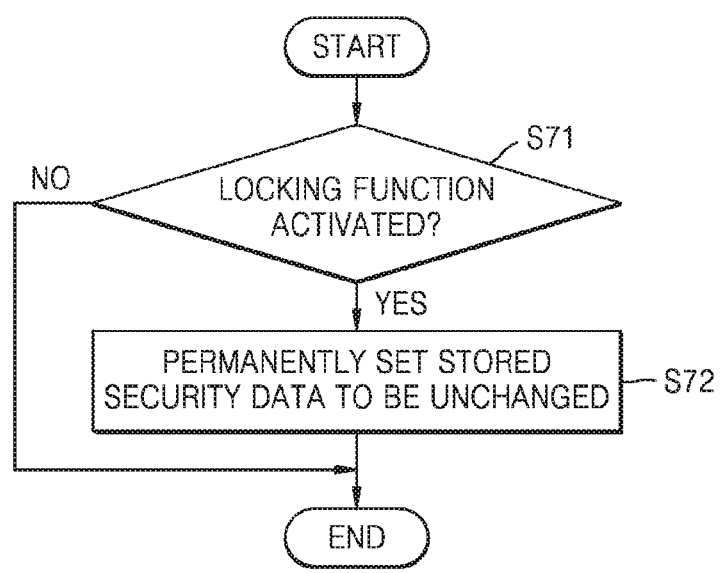
FIG. 7 is a flowchart illustrating operation of a security component receiving input data according to an example embodiment.

FIG. 6 is a view of the input data D_IN'' according to an example embodiment, and FIG. 7 is a flowchart of an exemplary operation of the security component 120 of FIG. 1 to receive the input data D_IN'' of FIG. 6, according to an example embodiment. For example, the input data D_IN'' of FIG. 6 may be provided to the security component 120' of FIG. 3, and the flowchart of FIG. 7 may show an operation of the security component 120' of FIG. 3. Hereinafter, FIGS. 6 and 7 will be described with reference to FIG. 3.

Referring to FIG. 6, the input data D_IN'' may include the user data D_USR, lock data LOCK, and the encrypted data D_ENC. Similar to that described above with reference to FIG. 2, the user data D_USR may include the user identifier U_ID, the user key U_KEY, and the seed SEED issued by the authorized user of the security component 120'' from the supplier of the security component 120''. In an example embodiment, as described above with reference to FIG. 5, the user data D_USR may include only the user identifier U_ID and the user key U_KEY. Similar to that described above with reference to FIG. 2, the encrypted data D_ENC may be generated by encrypting security data based on a master key issued to the authorized user of the security component 120' by the provider of the security component 120'.

The lock data LOCK may include data indicating whether to allow the security data D_SEC stored in the security component 120' to be changed due to provision of other input data D_IN" in the future. That is, when a locking function is activated according to the lock data LOCK of the authenticated input data D_IN" after the security component 120' stores the security data D_SEC, the security data D_SEC may be permanently set to be unchanged.

Referring to FIG. 7, in operation S71, an operation of determining whether to activate the locking function may be performed. For example, at least one of the user authentication processor 121', the master key generator 122', the decryption processor 123', and the security storage 124' of the security component 120' may determine whether the locking function has been activated based on the lock data LOCK included in the authenticated input data D_IN". If the locking function is activated according to the lock data LOCK, operation S72 may be performed subsequently.

In operation S72, an operation of permanently setting the stored security data D_SEC to be unchanged may be performed. For example, at least one of the user authentication processor 121', the master key generator 122', the decryption processor 123', and the security storage 124' may be permanently set so that the stored security data D_SEC is unchanged if the secure data D_SEC is stored in the security storage 124'. That is, at least one of the user authentication processor 121', the master key generator 122', the decryption processor 123', and the security storage 124' may be set not to perform an operation for the input data D_IN received after storing the security data D_SEC. As described above with reference to FIG. 3, the security component 120' may include the OTP device such as an anti-fuse, and the OTP device may be programmed when the locking function is activated. At least one of the user authentication processor 121', the master key generator 122', the decryption processor 123', and the security storage 124' may ignore the input data D_IN provided to the security component 120' later based on the programmed OTP device.

Figure 8:
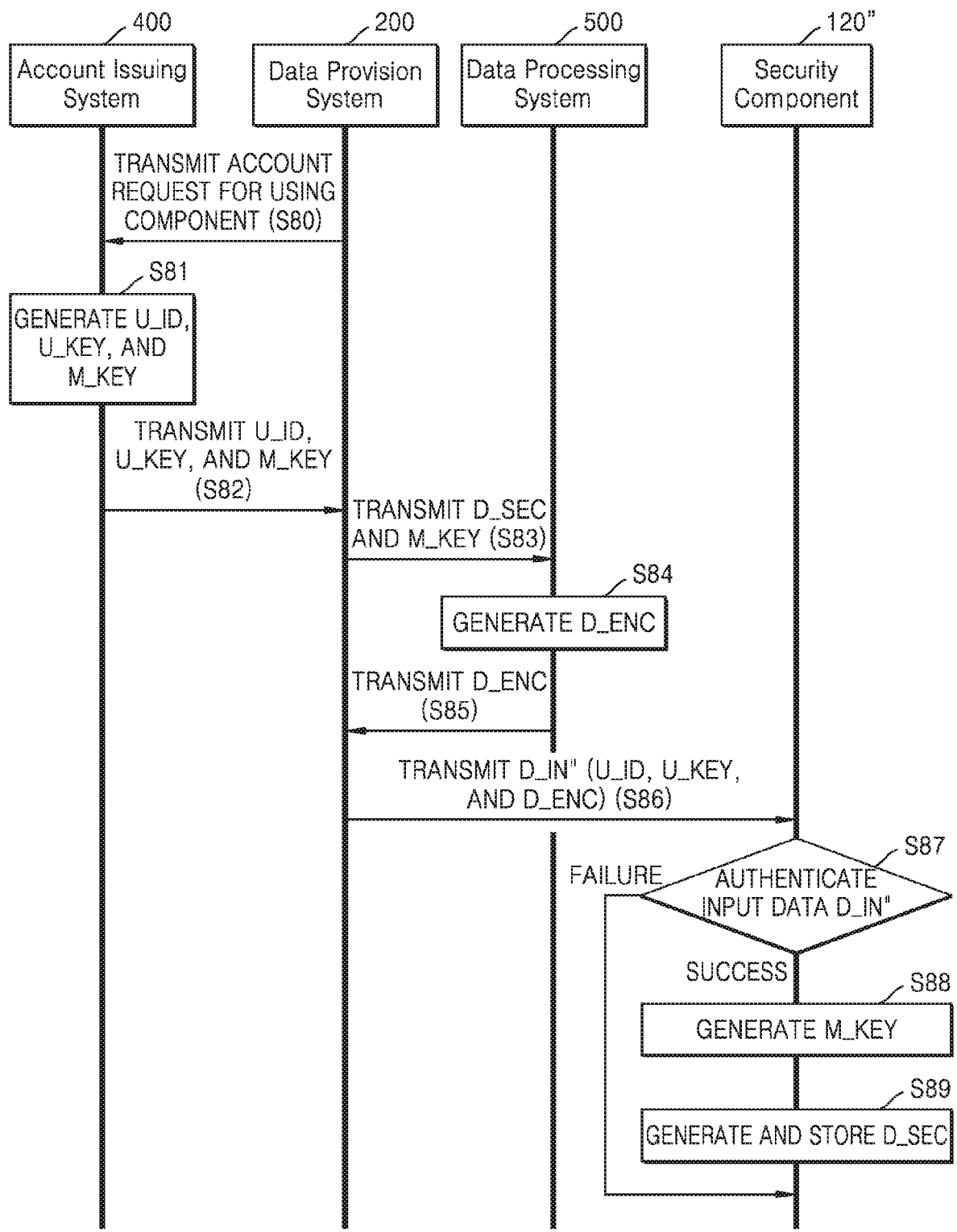
FIG. 8 is a view illustrating operation for provisioning security data into a security component over time according to an example embodiment.

FIG. 8 is a view of an operation for provisioning security data into the security component 120" over time, according to an example embodiment. In more detail, FIG. 8 is a view of signals transmitted between the security component 120" and external systems 200, 400, and 500 over time. As illustrated in FIG. 8, the security components 120", the data provisioning system 200, an account issuing system 400, and the data processing system 500 may be configured to communicate with each other. The systems 200, 400, and 500 may transmit and receive signals by communicating with each other in any communication manner. For example, the systems 200, 400, and 500 may be connected to a network, such as the Internet, and at least two of the systems 200, 400, and 500 may communicate with each other directly via a dedicated communication channel. Although not shown in FIG. 8, the security component 120" may be included in a product (e.g., the product 100 of FIG. 1) having a particular purpose, and the data provisioning system 200 and the data processing system 500 may communicate with the security component 120 by transmitting or receiving signals to or from a product that includes the security component 120". Hereinafter, FIG. 8 will be described with reference to FIG. 5.

The account issuing system 400 may be operated by the supplier of the security component 120 and the data provisioning system 200 and the data processing system 500 may be operated by the authorized user of the security component 120. In the specification, the operation of the system herein may refer to an operation by an operating entity, such as the supplier and the authorized user of the security component 120, and an operation by other entities under the control of the operating entity.

Referring to FIG. 8, in operation S80, the data provisioning system 200 may transmit an account request for component use to the account issuing system 400.

In operation S81, the account issuing system 400 may generate the user identifier U_ID, the user key U_KEY, and the master key M_KEY in response to the account request. For example, if the account request received from the data provisioning system 200 is from the authorized user of the security component 120", then the account issuing system 400 may generate the user identifier U_ID, the user key U_KEY, and the master key M_KEY for the authorized user of the security component 120". The account issuing system 400 may generate the user identifier U_ID and the user key U_KEY such that the user identifier U_ID and the user key U_KEY have a certain relationship. That is, because the user identifier U_ID is used by the security component 120" to generate an evaluation key, the account issuing system 400 may generate the user identifier U_ID and the user key U_KEY such that the evaluation key generated from the user identifier U_ID of the authorized user of the security component 120" is equal to the user key U_KEY.

The account issuing system 400 may generate the master key M_KEY such that the user identifier U_ID and/or the user key U_KEY and the master key M_KEY have a certain relationship. That is, as described below, the master key M_KEY generated by the account issuing system 400 may be used to generate the encrypted data D_ENC by encrypting the security data and may be used to decrypt the data D_ENC encrypted by the security component 120". Therefore, the master key M_KEY generated by the account issuing system 400 may be equal to the master key M_KEY generated from the user identifier U_ID and/or the user key U_KEY of the authorized user of the security component 120" by the security component 120".

In operation S82, the account issuing system 400 may transmit the user identifier U_ID, the user key U_KEY, and the master key M_KEY to the data provisioning system 200.

In operation S83, the data provisioning system 200 may transmit the security data D_SEC and the master key M_KEY to the data processing system 500. That is, the data provisioning system 200 may transmit the security data D_SEC and the master key M_KEY to the data processing system 500 in order to generate the encrypted data D_ENC from the security data D_SEC using the master key M_KEY. As described above, the security data D_SEC may include security data regarding the product including the security component 120".

In operation S84, the data processing system 500 may generate the encrypted data D_ENC. For example, the data processing system 500 may generate the encrypted data D_ENC by encrypting the security data D_SEC using the master key M_KEY, and the encryption method may correspond to a method of decrypting the encrypted data D_ENC in the security component 120. The data processing system 500 may use any encryption algorithm to generate the encrypted data D_ENC. For example, the data processing system 500, based on the master key M_KEY, may generate the encrypted data D_ENC using Data Encryption Standard (DES), Advanced Encryption Standard (AES), SEED, Academy Research Institute Agency (ARIA), Ron's Code 4 (RC4), Rivest Shamir Adleman (RSA), Elliptic curve cryptography (ECC), and Digital Signature Standard (DSS).

In operation S85, the data processing system 500 may transmit the encrypted data D_ENC to the data provisioning system 200.

FIG. 8 separately shows the data provisioning system 200 and the data processing system 500 operated by the authorized user of the security component 120". However, in an example embodiment, operations of the data provisioning system 200 and the data processing system 500 may be performed in a single system under the control of the security component 120". Therefore, the operation of transmitting the security data D_SEC and the master key M_KEY in operation S83 and the operation of transmitting the encrypted data D_ENC in operation S85 may be omitted.

In operation S86, the data provisioning system 200 may transmit the input data D_IN" to the security component 120". That is, the data provisioning system 200 may provide the security component 120" with the input data D_IN" including the user identifier U_ID, the user key U_KEY, and the encrypted data D_ENC.

In operation S87, the security component 120" may perform an operation of authenticating the input data D_IN". For example, the user authentication processor 121" of the security component 120" may generate an evaluation key from the user identifier U_ID and compare the generated evaluation key with the user key U_KEY used to generate the input data D_IN". If the generated evaluation key is equal to the user key U_KEY, that is, if the input data D_IN" is successfully authenticated, the security component 120" may perform operation S88 subsequently.

In operation S88, the security component 120" may generate a master key M_KEY. For example, the master key generator 122" of the security component 120" may generate the master key M_KEY according to a predetermined method from the user identifier U_ID and/or the user key U_KEY.

In operation S89, the security component 120" may generate and store the security data D_SEC. For example, the decryption processor 123" may generate the security data D_SEC by decrypting the encrypted data D_ENC using the master key M_KEY generated by the master key generator 122". Accordingly, the master key M_KEY may not be exposed to the outside in a process of transmitting the input data D_IN to the product 100, and as a result, the security data encrypted by the master key M_KEY may be protected.

Although FIG. 8 shows an example in which the master key M_KEY is generated from the user identifier U_ID and/or the user key U_KEY, the master key M_KEY, as described above with reference to FIGS. 2 and 3, may be generated from the seed SEED included in the input data D_IN. To this end, the account issuing system 400 may provide the seed SEED, as well as the user identifier U_ID, the user key U_KEY, and the master key M_KEY, to the data provisioning system 200, and the data provisioning system 200 may provide the input data D_IN including the seed SEED, that is, the seed SEED along with the user identifier U_ID, the user key U_KEY, and the encrypted data D_ENC, to the security component 120".

Figure 9:
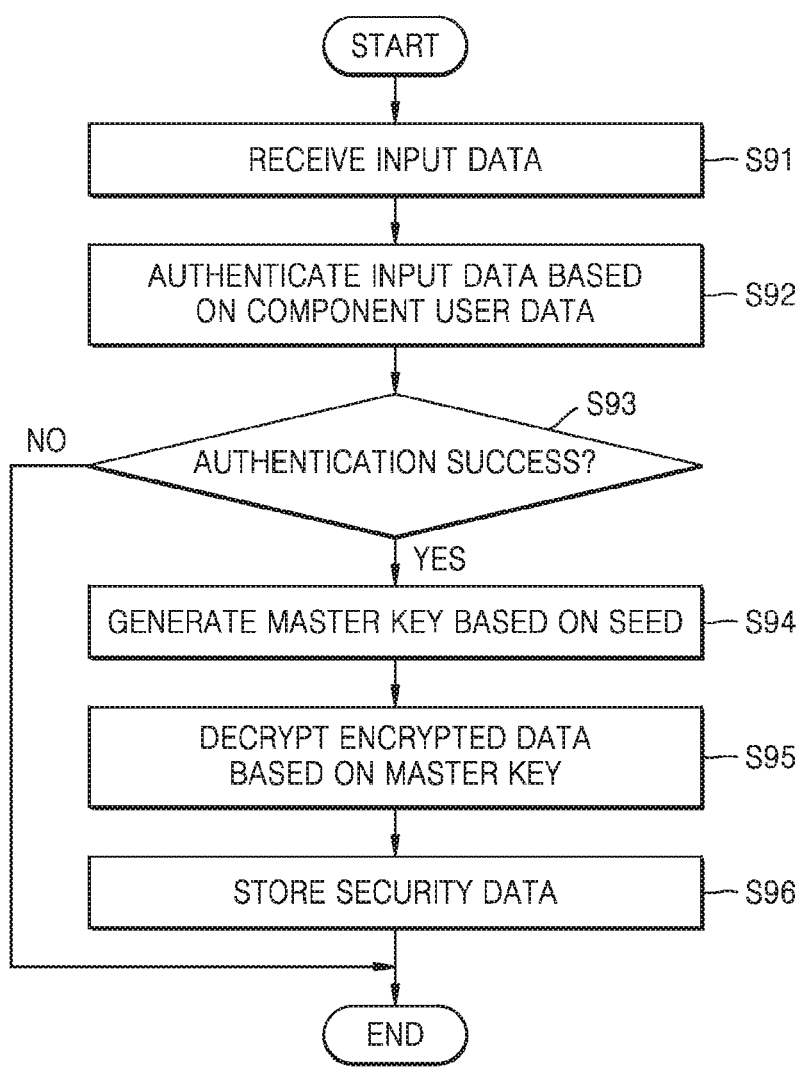
FIG. 9 is a flowchart illustrating a method of provisioning security data according to an example embodiment.

FIG. 9 is a flowchart of a method of provisioning security data according to an example embodiment. For example, the method of FIG. 9 may be performed by the security component 120 of FIG. 1. Hereinafter, FIG. 9 will be described with reference to FIG. 1.

In operation S91, the input data D_IN may be received. For example, the security component 120 may receive the input data D_IN from the outside of the product 100 (e.g., the data provisioning system 200 of FIG. 1) via the communication interface 110. As described above with reference to FIG. 2 and the like, the input data D_IN may include the component user data D_USR and the encrypted data D_ENC.

In operation S92, the input data D_IN may be authenticated based on the component user data D_USR. For example, the security component 120 may generate an evaluation key from the user identifier U_ID included in the component user data D_USR, and may determine whether the input data D_IN is provided by the authorized user of the security component 120 by comparing the evaluation key with the user key U_KEY included in the user data D_USR. If the input data D_IN is successfully authenticated in operation S93, operation S94 may be performed subsequently.

In operation S94, an operation of generating the master key M_KEY based on the seed SEED may be performed. For example, the security component 120 may extract the seed SEED included in the authenticated input data D_IN and generate the master key M_KEY in a predetermined manner based on the extracted seed SEED. In an example embodiment, the seed SEED may be included in the input data D_IN independent of other data. In another example embodiment, at least a part of the component user data D_USR of the input data D_IN may be used to generate the master key M_KEY.

In operation S95, the encrypted data D_ENC based on the master key M_KEY may be decrypted. For example, the security component 120 may generate the security data D_SEC by decrypting the encrypted data D_ENC in a predetermined manner using the master key M_KEY generated in operation S94.

In operation S96, the security data D_SEC may be stored. For example, the security component 120 may store the security data D_SEC in nonvolatile memory. In an example embodiment, the input data D_IN received by the security component 120 may be ignored such that the stored security data D_SEC is unchanged. In another example embodiment, as described above with reference to FIGS. 6 and 7, it may be determined whether the stored security data D_SEC is changeable according to the lock data LOCK included in the input data D_IN.

Figure 10:
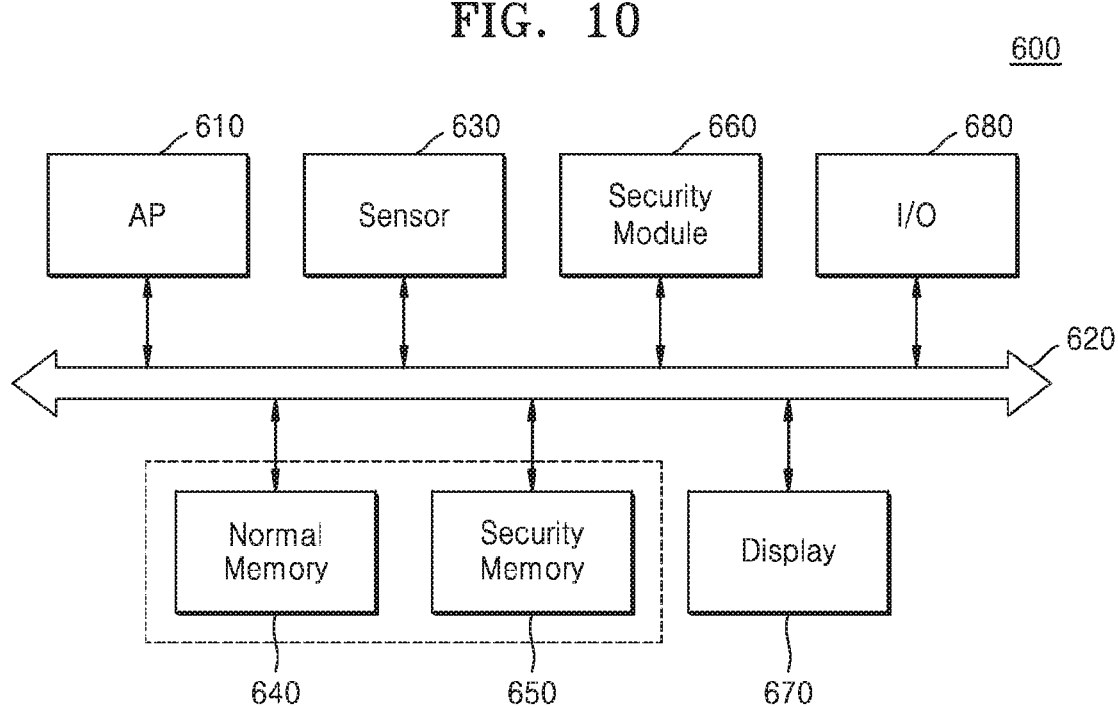
FIG. 10 is a block diagram of a product according to an example embodiment.

FIG. 10 is a block diagram of a product according to an example embodiment. As illustrated in FIG. 10, product may be an IoT device 600 capable of accessing an IoT, may include an application processor (AP) 610, a bus 620, a sensor 630, a normal memory 640, a security memory 650, a security module 660, a display 670, and an input/output device 680. Each of these components may be connected to the bus 620 and may exchange data with each other via the bus 620.

The IoT may refer to a network of things using wired/wireless communication. For example, the IoT may variously refer to an IoT network system, a Ubiquitous Sensor Network (USN) communication system, a Machine Type Communication (MTC) system, a Machine Oriented Communication (MOC) system, a Machine to Machine (M2M) communication system, a Device to Device (D2D) communication system, and the like.

The AP 610 may control general operation of the IoT device 600. For example, the AP 610 may execute applications that provide Internet browsers, games, moving images, and the like. In an example embodiment, the AP 610 may include one or more cores. For example, the AP 610 may include a multi-core such as a dual-core, a quad-core, and a hexa-core. Furthermore, the AP 610 may further include cache memory.

The sensor 630 may sense an external environment of the IoT device 600. In an example embodiment, the sensor 630, which may be an image sensor, may generate image data and provide the same to the application processor 610. In another example embodiment, the sensor 630 may be a biosensor that senses biometric data and may generate sensing data corresponding to the sensed data. For example, the sensor may generate sensing data by sensing a fingerprint, an iris pattern, a vein pattern, a heart rate, blood glucose, etc. According to various example embodiments, the sensor 630 may include any sensor, such as an illuminance sensor, an audio sensor, an acceleration sensor, and the like.

The normal memory 640 may store data necessary for the operation of the IoT device 600. For example, the normal memory 640 may include a volatile memory device, such as dynamic random access memory (DRAM), static random access memory (SRAM), and the like, and/or a nonvolatile memory device, such as a flash memory device, a solid-state drive (SSD), and the like.

The security memory 650 may store data requiring security during the operation of the IoT device 600. For example, the security memory 650, similar to the security storage 124' of FIG. 3, may store the security data D_SEC including security data for the IoT device 600 that needs to be protected from external inappropriate access. According to various example embodiments, the security memory 650 may store data sensed through the sensor 630, for example, data including biometric information. Although FIG. 10 shows the normal memory 640 and the security memory 650 separately, example embodiments are not limited thereto. The normal memory 640 and the security memory 650 may be integrated into one physical memory. In an example embodiment, the normal memory 640 and/or the security memory 650 may be detachably connected to the IoT device 600 by using, for example, a connector pin and/or a socket.

The security module 660 may manage the security memory 650. That is, the security module 660 may store data requiring security during the operation of the IoT device 600 or read the data from the security memory 650. For example, the security module 660 may perform an operation of at least one of the user authentication processor 121', the master key generator 122', and the decryption processor 123' of FIG. 3, and may control the storing and reading operations of the security data D_SEC stored in the security memory 650. The security module 660 may include a logic block designed by logic synthesis, a processor, or a software block executed by the processor.

The display 670 may output data. For example, the display 670 may output image data sensed by the sensor 630 or output data calculated by the application processor 610.

The input/output device 680 may include a component for receiving an input of a user of the IoT device 600, such as a touch pad, a keypad, an input button, etc., or may include a component for externally outputting a signal, such as a light-emitting diode (LED), speaker, and the like.

Figure 11:
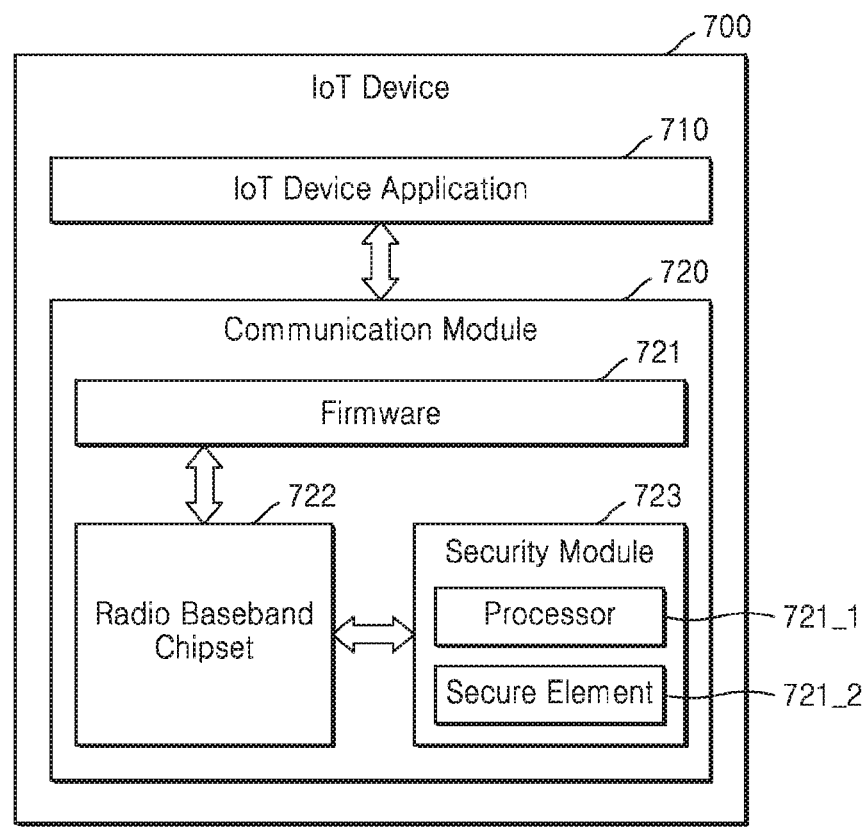
FIG. 11 is a block diagram of an Internet of Things (IoT) device according to an example embodiment.

FIG. 11 is a block diagram of an exemplary structure of hardware and software of the IoT device of FIG. 10, according to an example embodiment. As illustrated in FIG. 11, an IoT device 700 may include an IoT device application 710 and a communication module 720, wherein the communication module 720 may include firmware 721, a wireless baseband chipset 722, and a security module 723.

The IoT device application 710 may control the communication module 720 as a software block and may be executed by a central processing unit (CPU) of the IoT device 700 (e.g., the application processor 610 of FIG. 10). The communication module 720 may include a wired local area network (LAN), a wireless local area network (WLAN) such as Wireless Fidelity (WiFi), a wireless personal communication network (WPAN) such as Bluetooth, a wireless Universal Serial Bus (USB), ZigBee, Near Field Communication (NFC), Radio Frequency Identification (RFID), or a wireless communication block capable of exchanging data through a mobile communication system.

The firmware 721 may provide an Application Programming Interface (API) to the IoT device application 710 and may control the wireless baseband chipset 722 based on the control of the IoT device application 710. The wireless baseband chipset 722 may provide a connection to a wireless communication network. The security module 723 may store data (e.g., the security data D_SEC of FIG. 1) for authenticating the IoT device 700 to access the wireless communication network, and may authenticate the IoT device 700 for a wireless network service. According to an example embodiment, the security module 723 may authenticate data provided from outside the IoT device 700 (e.g., the input data D_IN of FIG. 1), and may generate security data from the authenticated data and store the generated security data.

Figure 12:
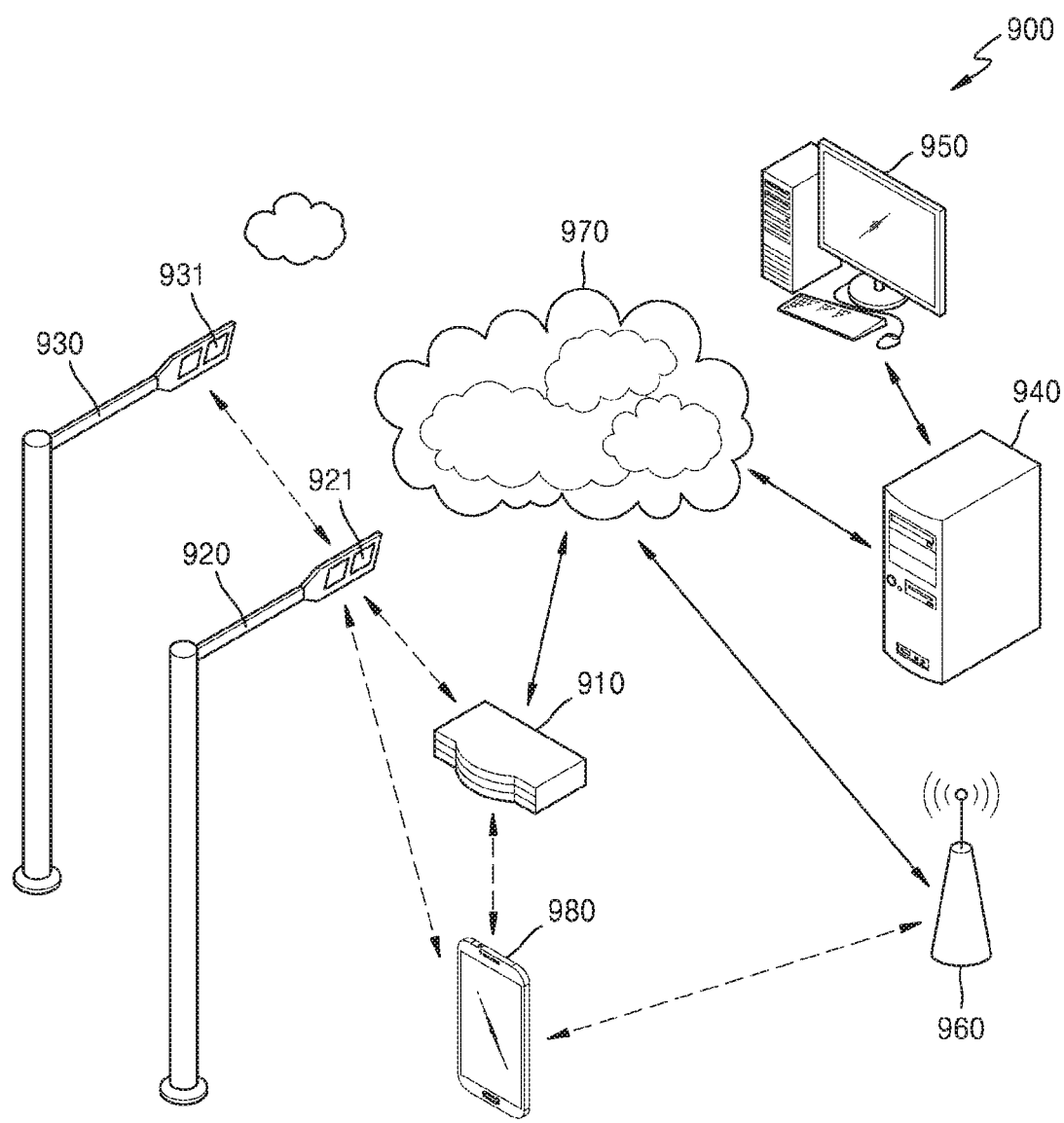
FIG. 12 is a view of a network system in which a product including a security component is used, according to an example embodiment.

FIG. 12 is a view of a network system 900 in which a product including a security component is used, according to an example embodiment. Referring to FIG. 12, the network system 900 may include a communication connection device 910, a plurality of lighting devices 920 and 930 communicably connected to the communication connection device 910, a server 940, a computer 950 to manage the server 940, a communication base station 960, a communication network 970, and a mobile device 980.

The lighting devices 920 and 930 may be street or a park lighting devices, and may include smart engines 921 and 931, respectively. Each of the smart engines 921 and 931 may include a sensor and a communication module for collecting data on a surrounding environment and may communicate with other peripheral devices according to a communication protocol such as WiFi, ZigBee, or LiFi as a non-limiting example. For example, the smart engine 921 may be communicatively connected to the other smart engine 931, and WiFi expansion technology (for example, a WiFi mesh network) may be used for communication between the smart engines 921 and 931. The smart engine 921 may be connected to the communication connection device 910 connected to the communication network 970, by wired and wireless communication. In order to improving efficiency of communication, a plurality of the smart engines (e.g., the smart engines 921 and 931), which are in a group, may be connected to the communication connection device 910.

The smart engines 921 and 931 may store unique data of the lighting devices 920 and 930 as security data, respectively. The security data stored in each of the smart engines 921 and 931 may be different and may be safely stored in the smart engines 921 and 931 by transmitting data (e.g., the input data D_IN of FIG. 1) to the lighting devices 920 and 930 after the lighting devices 920 and 930 are installed.

The communication connection device 910, an AP capable of performing wired and wireless communication, may relay communication between the communication network 970 and other devices. The communication connection device 910 may be connected to the communication network 970 by wired or wireless communication, and may be mechanically stored in, for example, one of the lighting devices 920 and 930.

The communication connection device 910 may be connected to the mobile device 980 through a communication protocol such as WiFi. A user of the mobile device 980, through the communication connection device 910 connected to the smart engine 921 of the adjacent lighting device 920, may receive data of a peripheral environment collected by the smart engines 921 and 931. The communication connection device 910 may send an authentication request to the smart engines 921 and 931, and authenticate the smart engines 921 and 931 based on an authentication response which is provided by the smart engines 921 and 931 based on the security data stored in the smart engines 921 and 931, thereby relaying communication between the smart engines 921 and 931 and the mobile device 980. The mobile device 980 may be connected to the communication network 970 through the communication base station 960, by using a wireless cellular communication method such as the third generation (3G) mobile communication system or fourth generation (4G) mobile communication system.

Meanwhile, the server 940 connected to the communication network 970 may receive data collected by the smart engines 921 and 931 of the lighting devices 920 and 930, and may monitor operation states of the lighting devices 920 and 930, simultaneously. In order to manage the lighting devices 920 and 930 based on the monitoring result of the operation states of the lighting devices 920 and 930, respectively, the server 940 may be connected to the computer 950 providing a management system. According to an example embodiment, similar to the data provisioning system 200 of FIG. 1, the server 940 may provide data for provisioning security data to the smart engines 921 and 931 of the lighting devices 920 and 930 via the communication network 970 and the communication connection device 910. As described above, the data provided by the server 940 may include data (e.g., the user identifier U_ID, the user key U_KEY, etc. of FIG. 8) previously provided by suppliers of the smart engines 921 and 931, and may include encrypted data according to data (e.g., the master key M_KEY of FIG. 8) provided by the supplier of smart engines 921 and 931. The computer 950 may execute software capable of monitoring and managing the operation states of the lighting devices 920 and 930 through the smart engines 921 and 931.

While aspects of example embodiments have been particularly shown and described, it will be understood that various changes in form and details may be made therein without departing from the spirit and scope of the following claims.

What is claimed is:

1. A security component configured to provide security data used for authenticating a product including the security component, the security component comprising:
   a hardware security storage;
   at least one non-transitory memory; and
   at least one processor configured to execute instructions stored in the at least one non-transitory memory to perform:
      receiving input data including component user data and encrypted data, both the component user data and the encrypted data being received from a data provisioning system;
      identifying whether the input data is provided by an authorized user of the security component based on the component user data of the input data;
      generating an enable signal that is activated based on the input data being identified as being received from the authorized user and is deactivated based on the input data not being identified as being received from the authorized user;
      generating a master key using the component user data of the input data based on the enable signal being activated;
      generating the security data by decrypting the encrypted data of the input data based on the master key and the enable signal being activated;
      storing the security data, as decrypted, in the hardware security storage based on the enable signal being activated; and
      outputting the security data based on the enable signal being deactivated.

2. The security component of claim 1, wherein the component user data of the input data comprises a user identifier and a user key,
   wherein each of the user identifier, the user key and the encrypted data is received from the data provisioning system, and
   wherein the at least one processor is further configured to execute instructions stored in the at least one non-transitory memory to perform generating an evaluation key based on the user identifier and authenticating the input data based on whether the evaluation key corresponds to the user key.

3. The security component of claim 2, wherein the component user data further comprises seed data,
   wherein each of the user identifier, the user key, the seed data and the encrypted data is received from the data provisioning system, and
   wherein the at least one processor is further configured to execute instructions stored in the at least one non-transitory memory to perform generating the master key based on the seed data.

4. The security component of claim 2, wherein the at least one processor is further configured to execute instructions stored in the at least one non-transitory memory to perform generating the master key based on at least one among the user identifier and the user key.

5. The security component of claim 1, wherein the hardware security storage is configured to permanently store the security data.

6. The security component of claim 5, wherein the hardware security storage comprises at least one among a One-Time Programmable (OTP) memory and a rewritable memory for storing the security data.

7. The security component of claim 1, wherein the hardware security storage is configured to permanently store the security data based on the input data indicating lock data.

8. A product configured to respond to a product authentication request based on security data provisioned in the product, the product comprising:
   a hardware communicator;
   at least one non-transitory memory;
   a hardware security storage; and
   at least one processor configured to execute instructions stored in the at least one non-transitory memory to perform:
      receiving input data comprising encrypted data and component user data via the hardware communicator, both the component user data and the encrypted data being received from a data provisioning system;
      authenticating the input data based on the component user data of the input data;
      generating an enable signal that is activated based on the input data being identified as being received from an authorized user and is deactivated based on the input data not being identified as being received from the authorized user;
      generating the security data by decrypting the encrypted data of the input data using the component user data of the input data based on the enable signal being activated;
      storing the security data in the hardware security storage based on the enable signal being activated; and providing the security data based on the enable signal being deactivated.

9. The product of claim 8, wherein the component user data comprises a user identifier and a user key,
wherein each of the user identifier, the user key and the encrypted data is received from the data provisioning system, and
wherein the at least one processor is further configured to execute instructions stored in the at least one non-transitory memory to perform generating an evaluation key based on the user identifier and authenticating the input data based on whether the evaluation key corresponds to the user key.

10. The product of claim 8, wherein the at least one processor is further configured to execute instructions stored in the at least one non-transitory memory to perform generating a master key based on the component user data based on the input data being authenticated and generating the security data by decrypting the encrypted data authenticated based on the master key.

11. The product of claim 8, wherein the hardware security storage is configured to permanently store the security data.

12. The product of claim 11, wherein the hardware security storage comprises at least one among a One-Time Programmable (OTP) memory and a rewritable memory for storing the security data.

13. The product of claim 8, wherein the security data comprises at least one among an identifier, a certificate, a private key, and a pre-shared key of the product.

14. The product of claim 8, wherein the product is configured to connect to Internet of Things (IoT) via the hardware communicator.

15. The product of claim 8, wherein the hardware communicator is further configured to receive the product authentication request, and
wherein the at least one processor is further configured to execute instructions stored in the at least one non-transitory memory to perform responding to the product authentication request based on the security data.

16. A method of authenticating a product based on security data provided by a security component included in the product, the method comprising:
receiving, by at least one processor, input data including component user data and encrypted data, both the component user data and the encrypted data being received from a data provisioning system;
identifying, by the at least one processor, whether the input data is provided by an authorized user based on the component user data of the input data;
generating, by the at least one processor, an enable signal that is activated based on the input data being identified as being received from the authorized user and is deactivated based on the input data not being identified as being received from the authorized user;
generating, by the at least one processor, a master key, using the component user data of the input data based on the enable signal being activated;
generating, by the at least one processor, the security data by decrypting the encrypted data of the input data based on the master key and the enable signal being activated;
storing, by the at least one processor, the security data in a security storage based on the enable signal being activated; and
providing, by the at least one processor, the security data based on the enable signal being deactivated.

17. The method of claim 16, wherein the component user data comprises a user identifier and a user key,
wherein each of the user identifier, the user key and the encrypted data is received from the data provisioning system, and
wherein the method further comprises:
generating, by the at least one processor, an evaluation key based on the user identifier; and
authenticating, by the at least one processor, the input data based on whether the evaluation key corresponds to the user key.

18. The method of claim 17, wherein the method further comprises generating, by the at least one processor, the master key based on at least one among the user identifier and the user key.

19. The method of claim 17, wherein the component user data further comprises seed data,
wherein each of the user identifier, the user key, the seed data and the encrypted data is received from the data provisioning system, and
wherein the method further comprises generating, by the at least one processor, the master key based on the seed data.

20. The method of claim 16 further comprising locking, by the at least one processor, the security data in response to the input data indicating a lock command.

* * * * *